US008422629B2

(12) United States Patent
Stokes et al.

(10) Patent No.: US 8,422,629 B2
(45) Date of Patent: Apr. 16, 2013

(54) SEEDLING COUNTER

(75) Inventors: Jimmy Lee Stokes, Aiken, SC (US); Edward Joseph Kelleher, Jr., West Columbia, SC (US)

(73) Assignee: Weyerhaeuser NR Company, Federal Way, WA (US)

(*) Notice: Subject to any disclaimer, the term of this patent is extended or adjusted under 35 U.S.C. 154(b) by 401 days.

(21) Appl. No.: 12/729,978

(22) Filed: Mar. 23, 2010

(65) Prior Publication Data

US 2010/0246762 A1 Sep. 30, 2010

Related U.S. Application Data

(60) Provisional application No. 61/163,935, filed on Mar. 27, 2009.

(51) Int. Cl.

| | |
|---|---|
| *G01F 1/66* | (2006.01) |
| *G01F 1/00* | (2006.01) |
| *H05G 1/28* | (2006.01) |
| *H05G 1/00* | (2006.01) |

(52) U.S. Cl.
USPC ............... 378/51; 378/95; 378/162; 378/204; 378/210

(58) Field of Classification Search .................... 378/51, 378/57, 62, 91, 95, 162, 165, 204, 210
See application file for complete search history.

(56) References Cited

U.S. PATENT DOCUMENTS

| | | | | |
|---|---|---|---|---|
| 3,768,645 | A | 10/1973 | Conway et al. | |
| 3,978,987 | A * | 9/1976 | Neville et al. | 209/576 |
| 4,166,948 | A * | 9/1979 | Steffen | 250/214 B |
| 4,326,590 | A | 4/1982 | Yancey | |
| 4,408,414 | A * | 10/1983 | Lehle et al. | 47/1.01 R |
| 4,607,452 | A * | 8/1986 | Maw et al. | 47/1.01 R |
| 4,848,590 | A * | 7/1989 | Kelly | 209/564 |
| 5,491,331 | A | 2/1996 | Armentrout | |
| 5,969,340 | A * | 10/1999 | Dragne et al. | 250/223 R |
| 6,355,923 | B2 * | 3/2002 | Pyyhtia et al. | 250/208.1 |
| 6,597,759 | B2 | 7/2003 | Mazess et al. | |
| 2004/0066890 | A1 * | 4/2004 | Dalmijn et al. | 378/57 |
| 2010/0163257 | A1 | 7/2010 | Francis | |

* cited by examiner

*Primary Examiner* — Anastasia Midkiff
(74) *Attorney, Agent, or Firm* — Woodcock Washburn LLP

(57) ABSTRACT

A method and apparatus for counting seedlings. A seedling moves through a seedling counter, which comprises a spectral energy emitter and a spectral energy detector. When the spectral energy detector detects a sufficient attenuation of the spectral energy for a sufficient amount of time, the spectral energy detector indicates the presence of a seedling. The spectral energy detector detects irregularities in the received spectral energy to indicate faults in the apparatus. In one embodiment, the seedling counter is adapted to use X-ray energy.

18 Claims, 11 Drawing Sheets

SEEDLING COUNTER

CROSS-REFERENCE TO RELATED APPLICATION

This application is entitled to and claims the benefit of priority under 35 U.S.C. §119 from U.S. Provisional Patent Application Ser. No. 61/163,935 filed Mar. 27, 2009, and titled "Seedling Counter," the contents of which are incorporated herein by reference.

BACKGROUND

Many crops, such as vegetables or tree seedlings, are first grown in nursery beds rather than planted directly. When the seedlings have reached an adequate size, the seedlings are harvested and packaged for subsequent replanting. While seedlings may be harvested by hand, the process is extremely labor intensive. Another option is to use a harvesting machine to recover the seedlings from the nursery bed. One such harvester is disclosed in U.S. Pat. No. 4,326,590, entitled Plant-Harvesting Device for Use with Variable Crop Row Spacing, assigned to Weyerhaeuser Company, assignee of the present disclosure ("the '590 patent"). A harvester such as the one in the '590 patent lifts the seedlings from the nursery bed, performs processing such as root untangling and soil removal on the seedlings, and provides the seedlings for packaging. Once packaged, the seedlings are often sold to customers or otherwise transferred to other locations for planting.

A persistent problem in packaging seedlings harvested through automated processes is in quantifying the number of seedlings contained in each package. It is desirable to have the same number of seedlings in each package, or at least to know exactly how many seedlings are in each package. For example, it is common to offer packages containing one thousand seedlings each for sale. Accuracy in the count of seedlings in each package is obviously important, as planting crews commonly pay workers by the number of seedlings planted. Further, if package counts vary, then planters will often count the seedlings in the package before planting, which can lead to harm to the seedling roots. Often, more seedlings are packed into each package than contracted for, merely to avoid problems reported by the purchaser.

Obtaining an accurate count of harvested seedlings is difficult for many reasons. One reason is that, given the vast number of seedlings in a given nursery bed, it is likely that the seedlings are not evenly distributed throughout the bed. Another reason is that not all of the seedlings will grow at the same rate. While a majority of the seedlings might be of an adequate size for harvesting, other seedlings may be too small, and would need to be culled or otherwise not included in the package count if they were harvested along with the good seedlings.

Various attempts have been made to count seedlings as they sequentially move past an automated counter. However, each of these seedling counters suffer from various deficiencies. For example, existing seedling counters tend to undercount by counting seedlings that are too close to one another while passing through the counter as a single seedling. As another example, existing seedling counters tend to overcount by failing to properly exclude cull seedlings from the count, or by counting branches, leaves, needles, or other debris passing through the counter as seedlings. As yet another example, existing seedling counters tend to lose accuracy when seedlings do not pass through the counter in an expected orientation. What is needed is a seedling counter that can overcome these limitations to produce accurate seedling counts.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for counting seedlings is provided. The method includes directing energy for impingement on a detector; sensing a reduction in detected energy indicating that an object is passing in front of the detector; analyzing the reduction in detected energy to determine a size of the object; and incrementing a seedling count when the size of the object meets one or more size thresholds.

In accordance with further aspects of the disclosure, a method for counting seedlings is provided. The method includes obtaining a first sample of X-ray radiation received from an X-ray source by a detector, the first sample comprising a count of received X-ray radiation; and comparing the count of the first sample to a count threshold. The method also includes, when the count is less than the count threshold, obtaining at least one additional sample of X-ray radiation received from the X-ray source by the detector; incrementing a width counter for each consecutive additional sample following the first sample for which a count of the additional sample remains less than the threshold, until an additional sample comprising a count that is not less than the threshold is obtained, and incrementing a seedling count if the width counter is greater than or equal to a width threshold.

In accordance with further aspects of the disclosure, a device for counting seedlings is provided. The device comprises an X-ray emitter, an X-ray detector arranged to detect X-ray radiation emitted by the X-ray emitter, and a detection processor coupled to the X-ray detector and configured to increment a seedling count upon sufficient attenuation of X-ray radiation detected by the detector.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
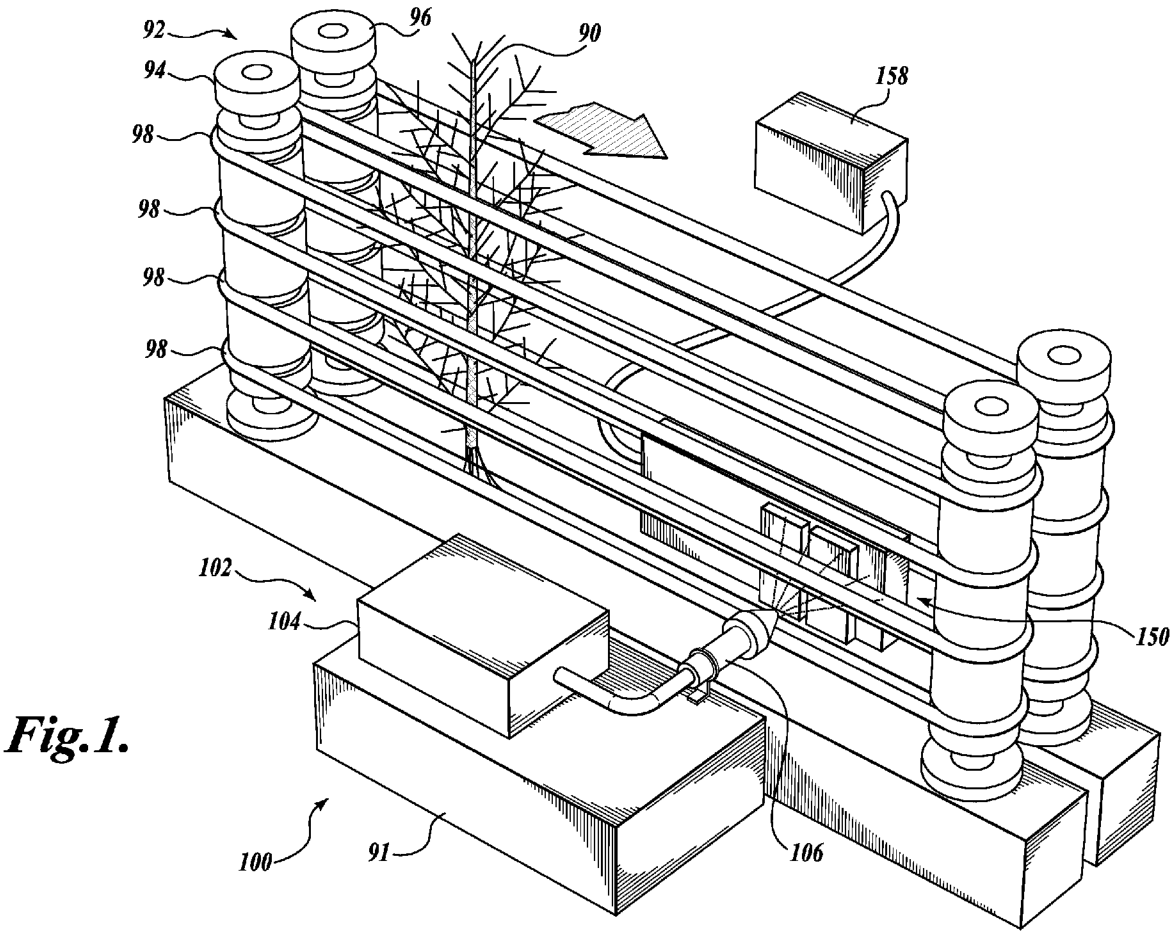
FIG. 1 is a perspective view showing a seedling counter incorporated into an apparatus for transporting seedlings, according to various embodiments of the present disclosure.

FIG. 1 illustrates a perspective view of one embodiment of a seedling counter 100 incorporated into one type of seedling transport mechanism. While the seedling counter 100 is shown associated with a conveyor 92, the seedling counter 100 can be incorporated into other systems in which seedlings are conveyed past the seedling counter 100, such as a conveyor in a warehouse. Alternatively, the seedling counter 100 can be moved past stationary seedlings to count the seedlings, for example, as when the seedling counter 100 is incorporated into a cart that is towed down a nursery bed row.

The conveyor 92 comprises a set of pinch belt conveyors 94, 96. Each pinch belt conveyor 94, 96 comprises multiple belts 98 of an elastic material. Other types of conveyors may be used, such as the seedling conveyor described in co-pending, co-owned U.S. patent application Ser. No. 12/347,149, incorporated herein by reference in its entirety. A seedling 90 enters the conveyor 92 and is gripped by the belts 98. As the pinch belt conveyors 94, 96 rotate, the seedling 90 is transported through the seedling counter 100, which includes an emitter assembly 102 that is located on one side of conveyor 92 and a detector 150 located on the opposite side of conveyor 92. After passing through the seedling counter 100, the seedling 90 is carried on for further processing, such processing possibly including packaging the seedling 90 with other seedlings that have passed through seedling counter 100. The emitter assembly 102 comprises a spectral energy generator 104 shown resting on an emitter base 91, and an energy emitter 106 that is coupled to the spectral energy generator 104. The energy emitter 106 is positioned so that radiation emitted by the energy emitter 106 passes through the opening between the belts 98 and is received by the detector 150.

In one embodiment, the seedling counter 100 is adapted to utilize relatively low energy ("soft") X-rays. As shall be described in more detail, the radiation reaching detector 150 will be attenuated or even blocked by an object such as a seedling 90 that is between energy emitter 106 and detector 150. Such X-rays have shown to be particularly useful in counting seedlings for many reasons. For example, the X-rays are not as sensitive to large groups of closely placed seedlings as other types of energy previously utilized by seedling counters. That is, the matter penetrating abilities of X-rays can be used to count individual seedlings that pass through the detector, even if there is little to no clear space between the seedlings. As another example, compared to other forms of radiation with matter-penetrating abilities such as gamma radiation, X-rays may be safely and easily generated at an energy level that can be detectably attenuated by seedlings. As yet another example, a seedling counter 100 using X-rays is less susceptible to errors caused by accumulation of foreign material in front of the detector. As long as the X-rays penetrate the foreign material, the detector will simply indicate a new baseline energy reading, as opposed to other detectors using, for example, photodetectors which can become obscured by foreign material and therefore nonfunctional.

Figure 2:
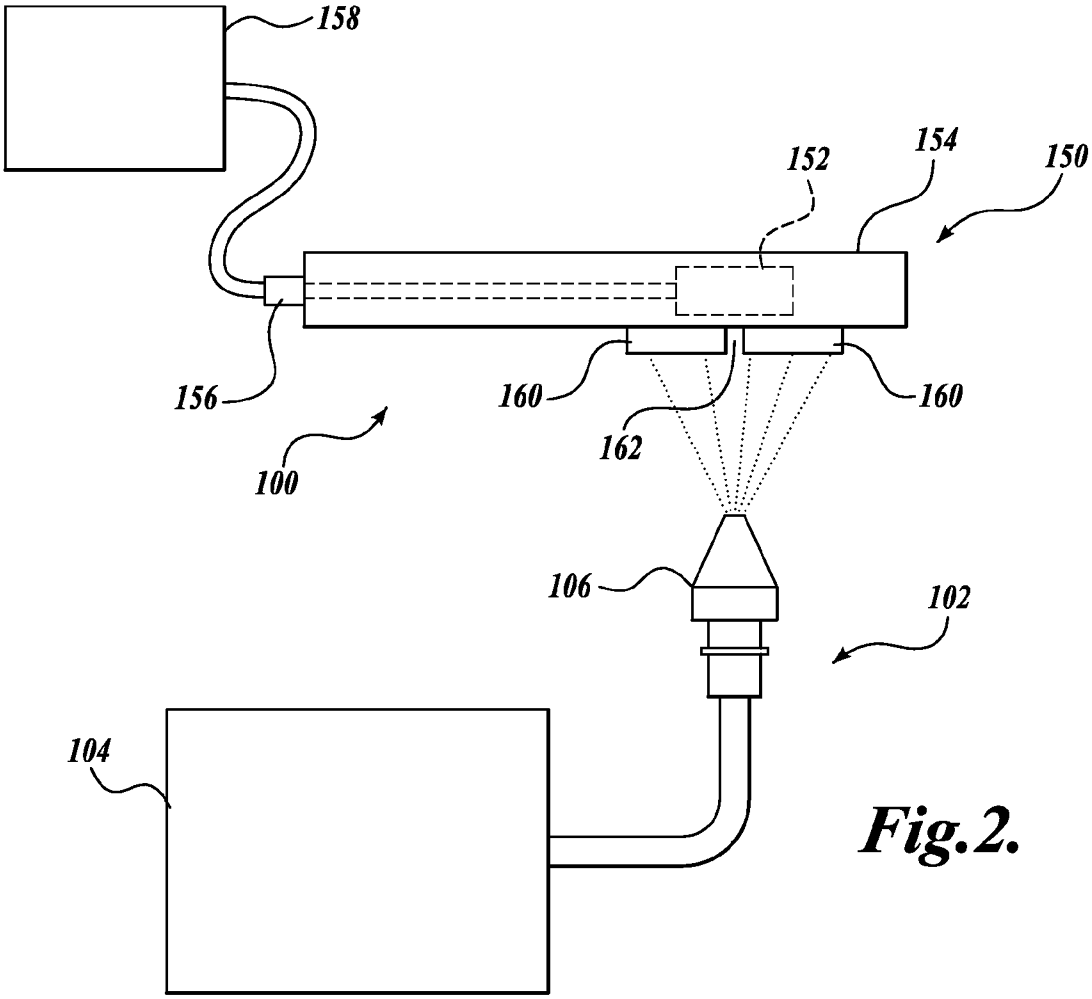
FIG. 2 illustrates a top view of the seedling counter shown in FIG. 1.

FIG. 2 illustrates a top view of the seedling counter 100. For clarity, the conveyor 92 is not pictured here. Several types of detectors may be used to detect attenuation of the spectral energy. For example, many spectral energy detectors in use in the art detect the spectral energy, and output a pattern of pixels representing the intensity of detected energy at particular points on the detector. This pattern of pixels may then be analyzed by a processor to determine an amount of attenuation. However, the low sensitivity of this type of detector and the added processing required to analyze the pixels imposes limitations on the size of the objects that can be detected and on the speed at which the objects can pass by or through the counter.

In the illustrated embodiment, the detector 150 comprises a scintillator 152 positioned to detect spectral energy emissions from the energy emitter 106. In an embodiment using X-rays, the scintillator 152 may be a scintillating crystal such as a bismuth germanate (BGO) crystal. The scintillator 152 is coupled to a photomultiplier 156 to form a scintillation counter, which is in turn coupled to a detection processor 158. The photomultiplier 156 converts photons generated by the scintillator 152 into electrical signal pulses, which are analyzed by the detection processor 158. This detector produces a value, or "count," which is a measure of the photons generated over the entire area of the scintillator 152 over a given period of time, or "detection interval." In one embodiment, the scintillator has a volume of approximately one inch by one half inch by one quarter inch. This provides for a much higher sensitivity than previous pixel-generating detectors, and therefore allows the detector 150 to operate faster, and to detect smaller objects, than previous devices. Two metal strips 160 are arranged between the scintillator 152 and the energy emitter 106 to form an aperture 162 for collimating the energy reaching the scintillator 152 for improving the performance of the detector 150.

In other embodiments, different scintillation crystals could be used, such as a Cesium Iodide (CsI) crystal, though the BGO crystal embodiment should result in lower cost and greater resistance to environmental conditions. While BGO crystals are sensitive to temperature, the use of a photomultiplier to collect the total volume of scintillations minimizes the most readily apparent effects of temperature on the crystal, such as differences in energy or pulse height. Despite the minimal effects of temperature on the detector 150 as described above, in some embodiments, the detection processor 158 is coupled to a temperature sensor to allow the detection processor 158 to compensate for the effects of temperature on the performance of the scintillation crystal.

The scintillator 152 is housed within a protective detector housing 154 to allow the detector 150 to operate in debris-filled or otherwise harsh environments. In one embodiment, X-rays with an energy on the order of 5-15 keV are used, which may be produced by an X-ray voltage from about 15,000 volts to about 30,000 volts. Soft X-rays having energies this low provide improved contrast for counting thin, low density material such as seedlings. In such an embodiment, the detector housing 154 comprises a material which is substantially transparent to X-rays. One appropriate material is a low density plastic such as UHMW polyethylene, but other materials may be used. Also, use of soft X-rays in this energy range allow the collimating metal strips 160 to be very thin and easy to manipulate, on the order of one tenth of one inch thick. Use of higher energy X-rays would require thicker material for collimation.

In some embodiments, photodetectors other than a photomultiplier tube could be used, such as photodiodes and phototransistors. However, photodiodes and phototransistors are not as sensitive as photomultiplier tubes, and would require the use of X-rays having a higher energy. In still other embodiments, detectors other than scintillation-type detectors could be used, such as solid state detectors like Cadmium Telluride (CdTe) or Cadmium Zinc Telluride (CZT) detectors. However, these detectors would be more costly than the scintillation-type detector described above when obtained in a size needed to count seedlings.

Figure 3:
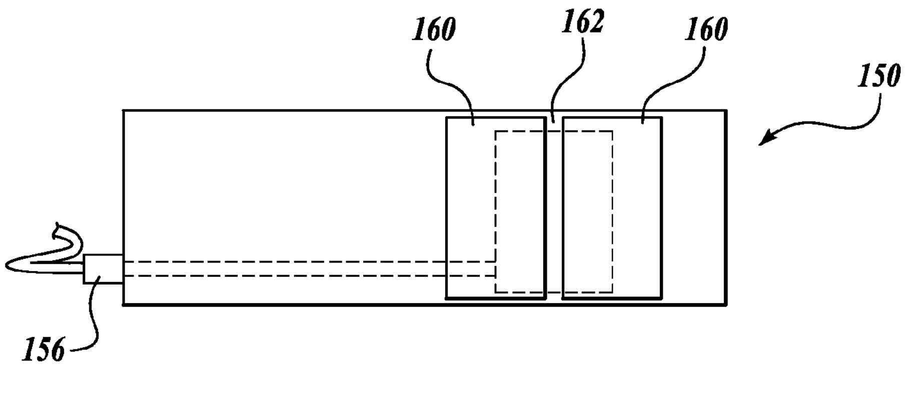
FIG. 3 illustrates a front view of a detector portion of the seedling counter shown in FIG. 1.

FIG. 3 illustrates a front view of the detector 150. The scintillator 152 is shown in phantom to indicate that it is within the detector housing 154. The metal strips 160 are positioned in front of the scintillator 152 in spaced apart relationship to form an aperture 162 that collimates the energy before it strikes the scintillator 152. The photomultiplier 156 is shown coupled to the scintillator 152. In one embodiment, the aperture 162 is configured such that it is smaller than the expected diameter of the seedlings to be counted. Hence, if the detector 150 is configured to measure seedlings primarily between three millimeters and six millimeters in diameter, the aperture 162 would be less than three millimeters in width.

Figure 4A:
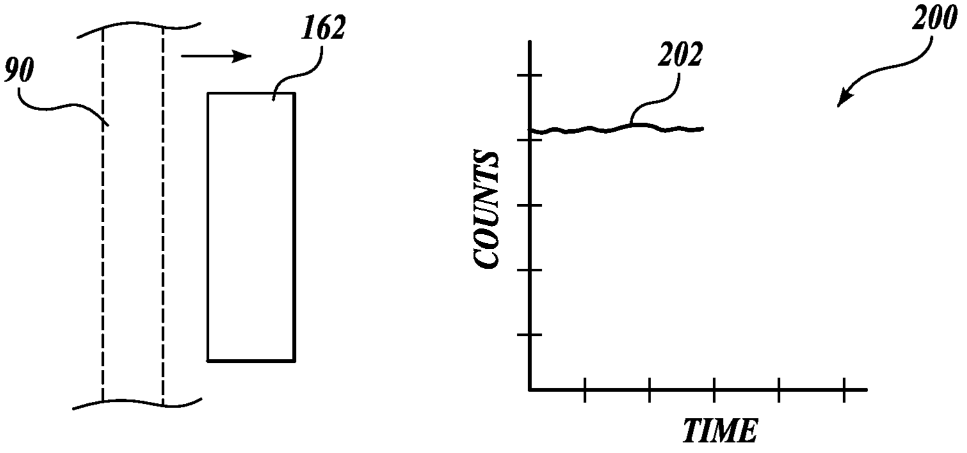
FIGS. 4A-4C graphically indicate, in somewhat idealized form, output of the seedling counter shown in FIG. 1 as a seedling passes through the counter.
Figure 4B:
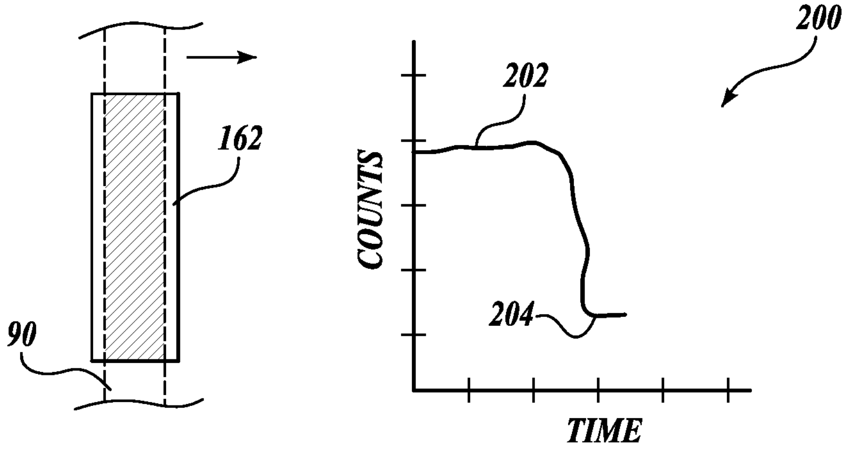
Figure 4C:
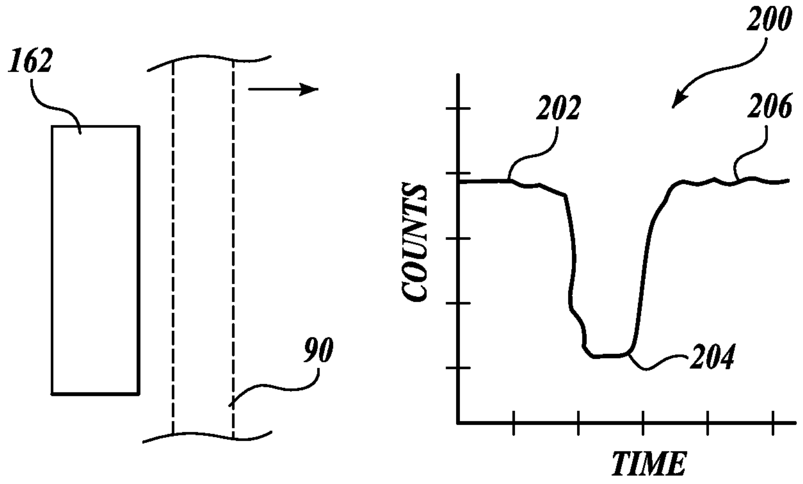

As discussed above, the detector 150 is configured to repeatedly generate a count of detected X-rays over a detection interval. A drop in the count is intended to indicate an object passing in front of the detector 150. FIGS. 4A-4C illustrate the effect on the generated counts as an object passes the detector 150. A graph 200 is used to illustrate the counts, depicted on the Y-axis, as they change over time, depicted on the X-axis. In FIG. 4A, a seedling 90 (shown in phantom), is traveling toward the aperture 162 of the detector 150, but has not yet eclipsed the aperture 162. Hence, the counts remain at a baseline count 202. In FIG. 4B, the seedling 90 has traveled in front of the aperture 162, as shown by the shaded portion. As the X-rays are attenuated over the shaded portion, the graph 200 shows that the counts have fallen from the baseline count 202 to an attenuated count 204. Finally, in FIG. 4C, the seedling 90 has moved completely beyond the aperture 162. Accordingly, the counts shown in the graph 200 have returned from the attenuated count 204 to the baseline count 206. The difference between the baseline count 202 and the attenuated count 204 and the amount of time spent at an attenuated count 204 can be used to determine the size of the seedling passing the detector.

Figure 5:
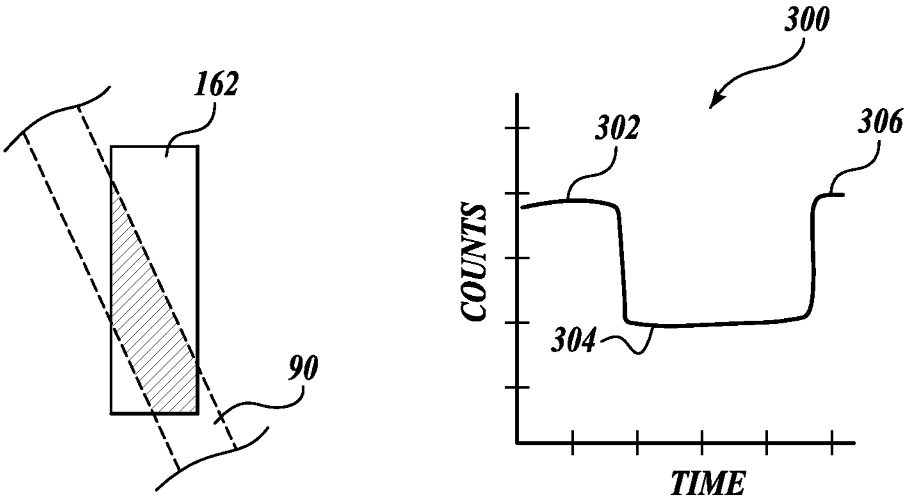
FIG. 5 graphically indicates an exemplary output of the seedling counter shown in FIG. 1 when a seedling is not ideally positioned as it passes through the counter.

Some previous seedling counters were very sensitive to the orientation of the seedling as it passed through the counter. For example, if a seedling counter was measuring the height of a seedling, it would be important that the seedling passed through the counter vertically, or else the height measurement would be inaccurate. In contrast, the detector 150 has much less sensitivity to the orientation of seedlings. FIG. 5 illustrates one example of a seedling 90 passing in front of the aperture 162 at a tilted orientation. While the shaded portion in which the seedling 90 eclipses the aperture 162 is not as large as the shaded area shown in FIG. 4B, the graph 300 shows that the counts nevertheless exhibit similar behavior in starting at a baseline count 302, falling to an attenuated count 304, and returning to the baseline count 306. While the shape of the curve in the graph 300 will be different than the shape of the curve of graph 200, the seedling 90 will still be detectable despite its different orientation.

In some embodiments, the seedling counter 100 is also capable of detecting when multiple seedlings pass through the counter at the same time. When two seedlings which overlay each other pass through the seedling counter 100, the counts will be attenuated in a manner similar to the graph 200 shown in FIGS. 4A-4C. However, while the width of the trough will be approximately the same size as that shown in FIG. 4C, the depth of the trough will be much deeper. The detection processor 158 can be configured to detect such instances where the trough is of a width to indicate a single seedling but deep enough to indicate multiple seedlings, and to indicate multiple seedlings accordingly.

The seedling counter 100 is capable of quickly and efficiently measuring objects at a relatively high rate. For example, if the detection interval is configured to be about one hundredth of a second, and the smallest seedling to be measured has a diameter of about two-tenths of an inch, the seedlings may be fed through the seedling counter 100 at a rate of about six inches per second. The seedling counter 100 also functions despite irregularities in how the objects are passed through the seedling counter 100, such as different orientations, lack of space between the objects, the presence of branches and debris, and so on.

Figure 6:
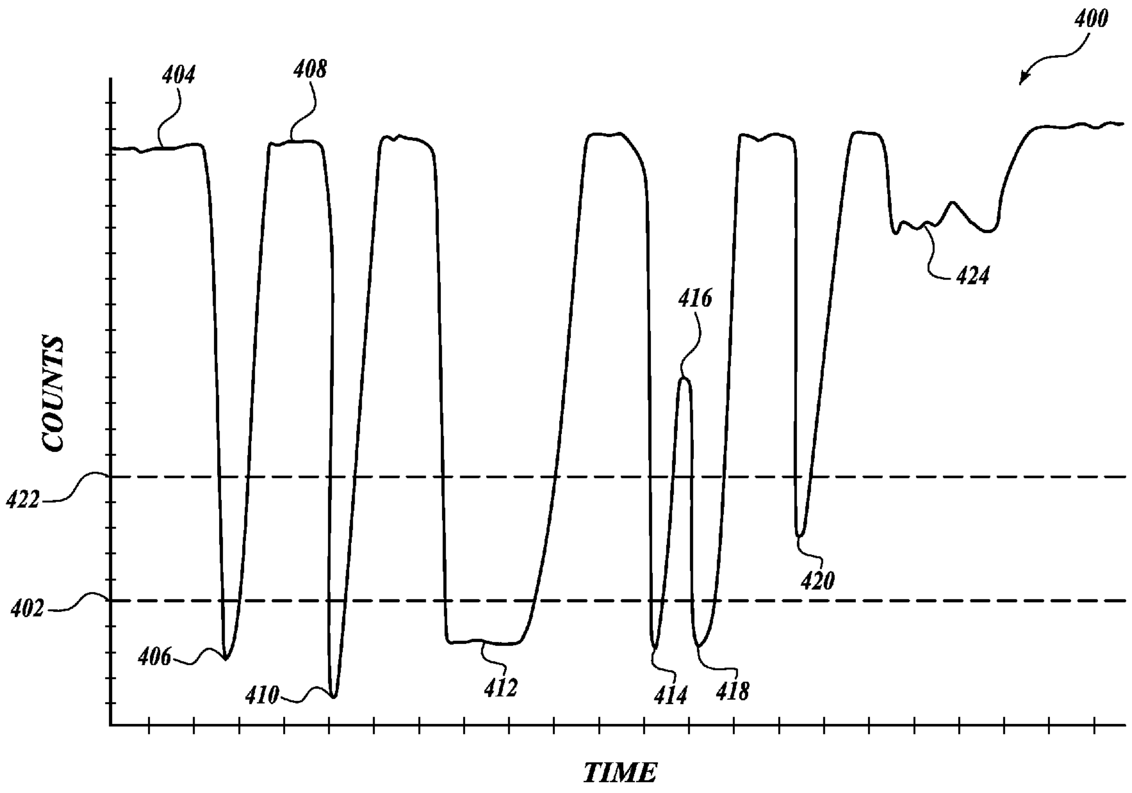
FIG. 6 graphically depicts an example of the output produced by the seedling counter of FIG. 1 as a sequence of seedlings have passed the counter.

FIG. 6 is a graph 400 illustrating an example of how the seedling counter 100 handles various different situations during operation. In general, the detector 150 will indicate the presence of a seedling if the count drops below a seedling threshold 402 for a sufficient amount of time. Similar to FIGS. 4A-4C above, the graph 400 shows the count starting at a baseline count 404, falling below a seedling threshold 402 as a first seedling 406 passes in front of the detector, and then returning to the baseline count 408. When the count crosses back above the seedling threshold 402, the detection processor 158 indicates that a seedling passed through the seedling counter 100 if the count remained below the seedling threshold 402 for an adequate amount of time. As the conveyor 92 continues to move, the count again falls below the seedling threshold 402 as a second seedling 410 passes in front of the detector, and the detection processor 158 indicates that a second seedling has passed through the counter.

If a larger seedling passes through the seedling counter 100, it will attenuate the detected energy for a greater amount of time. However, so long as the count passes below the seedling threshold 402, the seedling should be properly counted as a single seedling upon the return of the count above the seedling threshold 402. For example, the trough 412 shows a larger seedling passing through the seedling counter 100. The counts remain below the seedling threshold 402 for a longer time than the smaller seedlings 406, 410, but the trough 412 will nevertheless only be counted as a single seedling.

As the trunks of seedlings are roughly cylindrical, some cross sections of the seedlings will be thicker than others. Accordingly, not all portions of the seedling attenuate X-rays to the same extent; the center of a seedling will attenuate X-rays to a greater extent, and the edges of a seedling will attenuate X-rays to a lesser extent. If the seedling threshold 402 is set appropriately, the seedling counter 100 can count consecutive seedlings fed through the seedling counter 100 with little to no empty space between them, as the detector 150 will notice the thinner portions of the seedlings as indicating a new seedling. For example, trough 414 shows the detection of a first seedling that is touching a second seedling. As the seedlings are moved through the seedling counter 100, the counts rise above the seedling threshold 402 as a thinner portion of the seedlings passes the detector 150. However, the counts will only rise to an intermediate peak 416 instead of all the way to the baseline count 404 before dropping again to trough 418 as the second seedling passes the detector. Since intermediate peak 416 is higher than the seedling threshold 402, the seedling counter 100 will properly detect this as two seedlings instead of one.

The seedling counter 100 is able to prevent seedlings that are too small (commonly referred to as "culls") from being counted as acceptable seedlings. Specifically, cull seedlings fail to cause the counts to drop below the seedling threshold 402. The seedling counter 100 is also not as sensitive to debris passing in front of the detector 150 as previous counters. For example, trough 420 shows a cull seedling passing in front of the detector 150. Although the trough 420 does diverge sharply from the baseline count 404, the cull seedling will not be counted because the trough 420 is not low enough to pass the seedling threshold 402. Similarly, trough 424 shows a typical mass of debris or seedling branches passing in front of the detector 150. This trough 424 will also not be counted as a seedling, as it also failed to pass the seedling threshold 402.

In some embodiments, the seedling counter 100 can keep track of cull seedlings as well as acceptable seedlings. For example, an embodiment can include a cull threshold 422. As trough 420 did not reach the seedling threshold 402, it would not be counted as a seedling. However, since trough 420 did reach the cull threshold 422, the detection processor 158 can increment a cull counter in a manner similar to the manner in which it maintains a count of acceptable seedlings.

Figure 7:
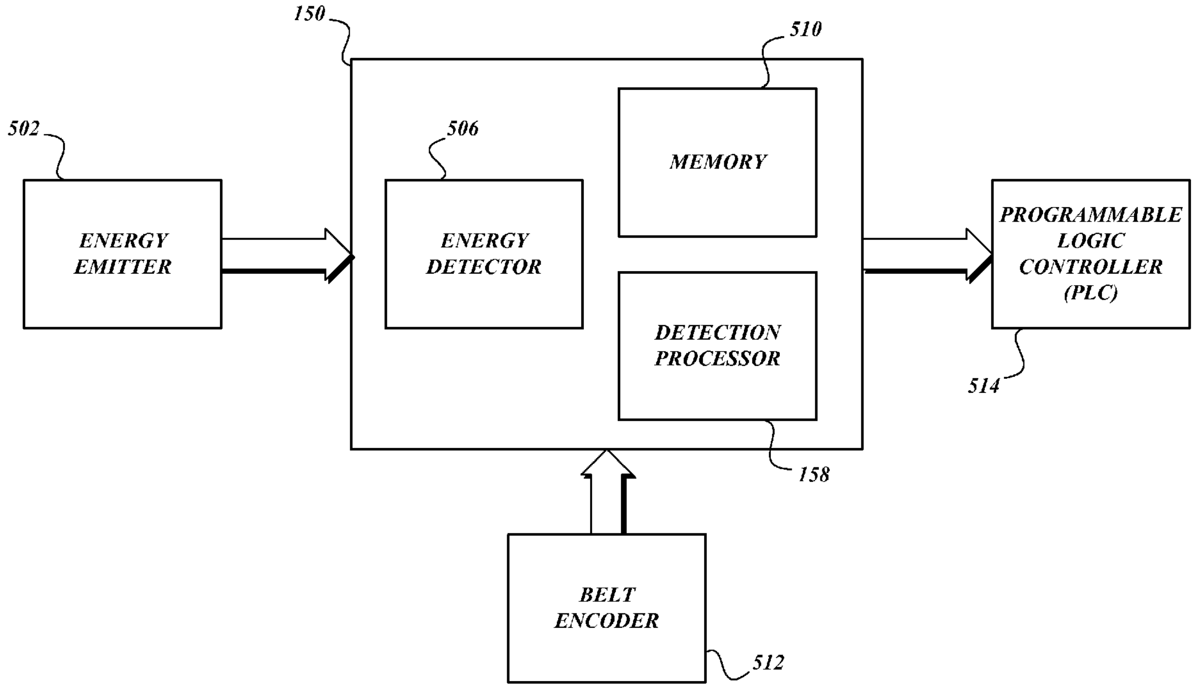
FIG. 7 is a block diagram illustrating components of a seedling counter according to various embodiments of the present disclosure.

FIG. 7 is a block diagram illustrating components of an embodiment of a seedling counter 100 and their functional relationships. An energy emitter 502 transmits energy that is detected by a detector 150, as indicated by an arrow. The energy emitter 502 and detector 150 may be identical to the emitter 106 and detector 150 described relative to FIG. 1. The detector 150 of FIG. 7 comprises an energy detector 506, a detection processor 158, and a memory 510. The energy detector 506 receives the spectral energy transmitted by the energy emitter 502, and creates a count once every detection interval. As indicated by an arrow, the belt encoder 512 provides a signal representing the speed at which the conveyor 92 is moving or, equivalently, the distance traveled during each detection interval, to the detector 150. The detection processor 158 reads the count generated in each detection interval and, when the counts drop for a detected number of detection intervals, uses the signal provided by the belt encoder 512 and the detected number of detection intervals to determine the size of a seedling or other object that passed in front of the detector 150 (as further described below).

The memory 510 is a computer-readable storage medium that provides storage for a count table. This storage medium may be a hard drive, floppy disk, RAM, flash memory, and the like. The count table is updated by the detection processor 158 and is used to ensure that the counts received by the energy detector 506 match an expected distribution. For example, if the energy detector 506 is working properly, the counts of X-rays received by the energy detector 506 are expected to correspond to a Poisson distribution. The detection processor 158 performs statistical analysis on entries stored in the count table to determine if the counts correspond to the expected Poisson distribution. The memory 510 may also store computer-executable instructions that, if executed by the seedling counter 100, will cause the seedling counter 100 to implement one of the methods described below.

The detector 150, via the detection processor 158, transmits outputs to a programmable logic controller (PLC) 514. The outputs comprise signals indicating conditions such as an acceptable seedling or a cull has passed through the seedling counter 100, or that a fault has occurred. The PLC 514 can use this information to store a count of how many acceptable seedlings or culls have passed through the seedling counter 100. These counts can be displayed to a user, and, in addition, used to control other functions of the apparatus containing the seedling counter 100. For example, the acceptable seedling count may be used to further control the operation of a lifter apparatus, such as to cause the lifter to stop or pause operation once a particular count has been reached, or to cause the lifter to generate a label for a package of seedlings with a count of the acceptable seedlings contained therein.

Figure 8:
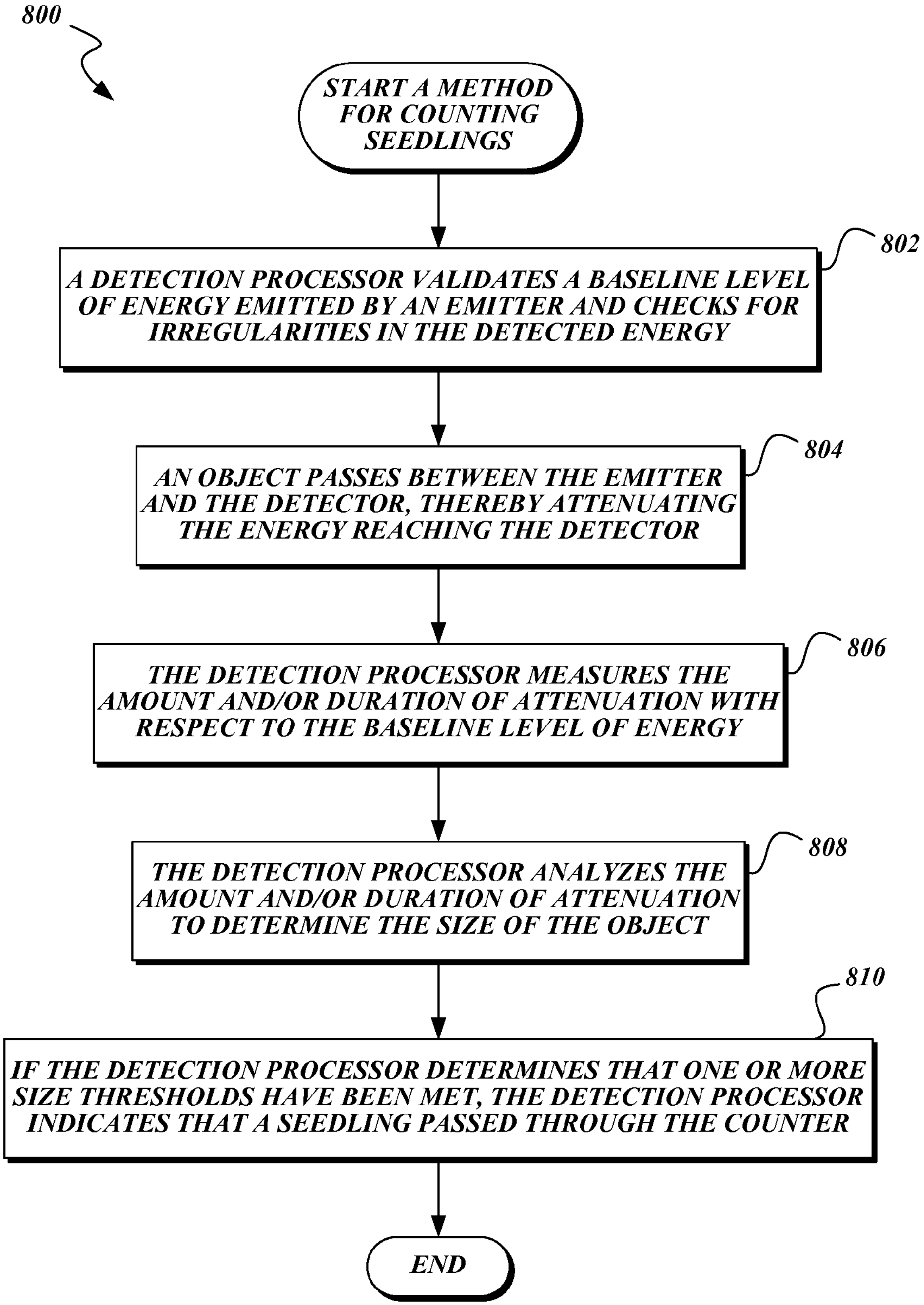
FIG. 8 is a process diagram illustrating a method for counting seedlings according to various embodiments of the present disclosure.
Figure 9A:
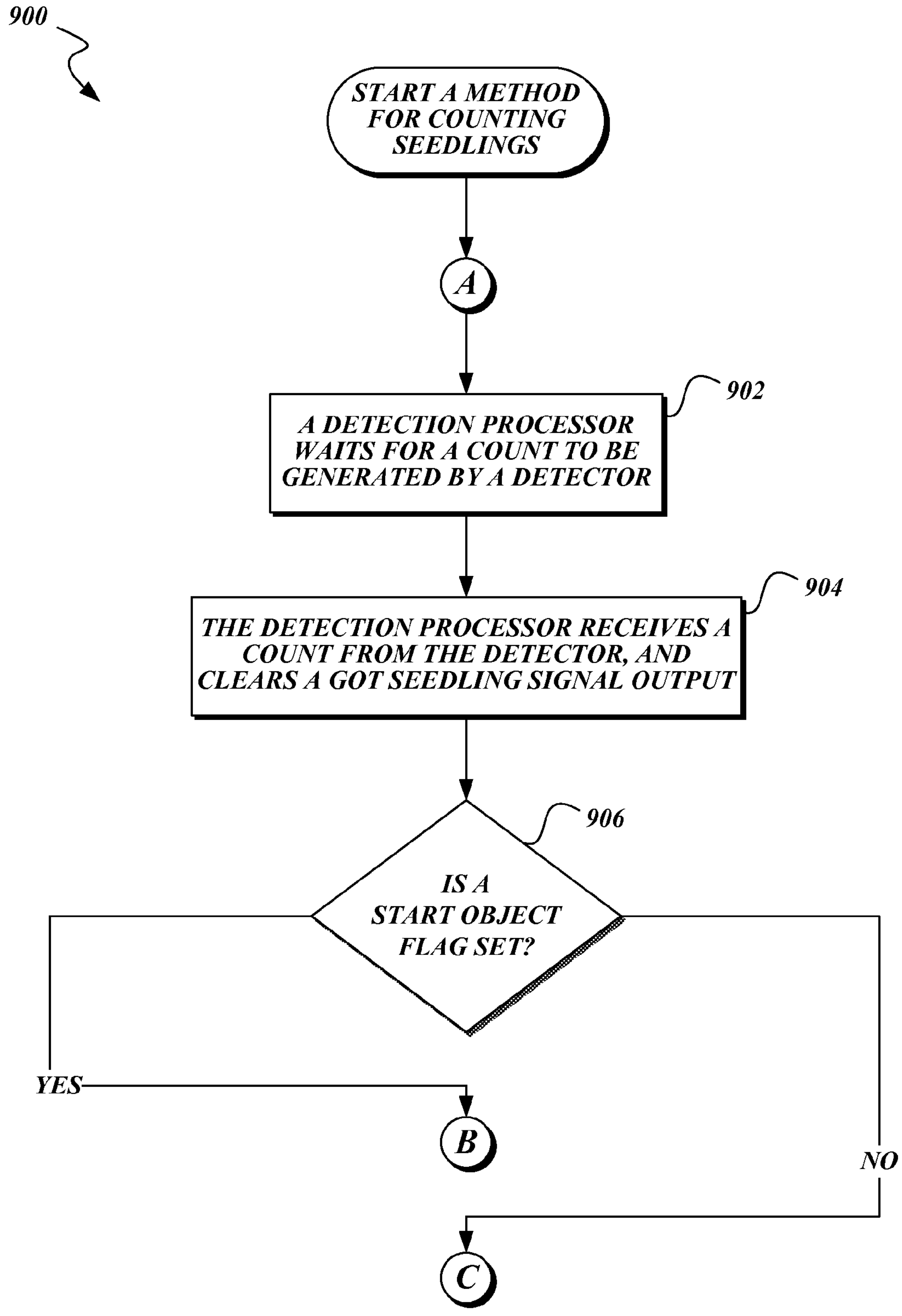
FIGS. 9A-9D are process diagrams illustrating a more detailed method for counting seedlings according to various embodiments of the present disclosure.
Figure 9B:
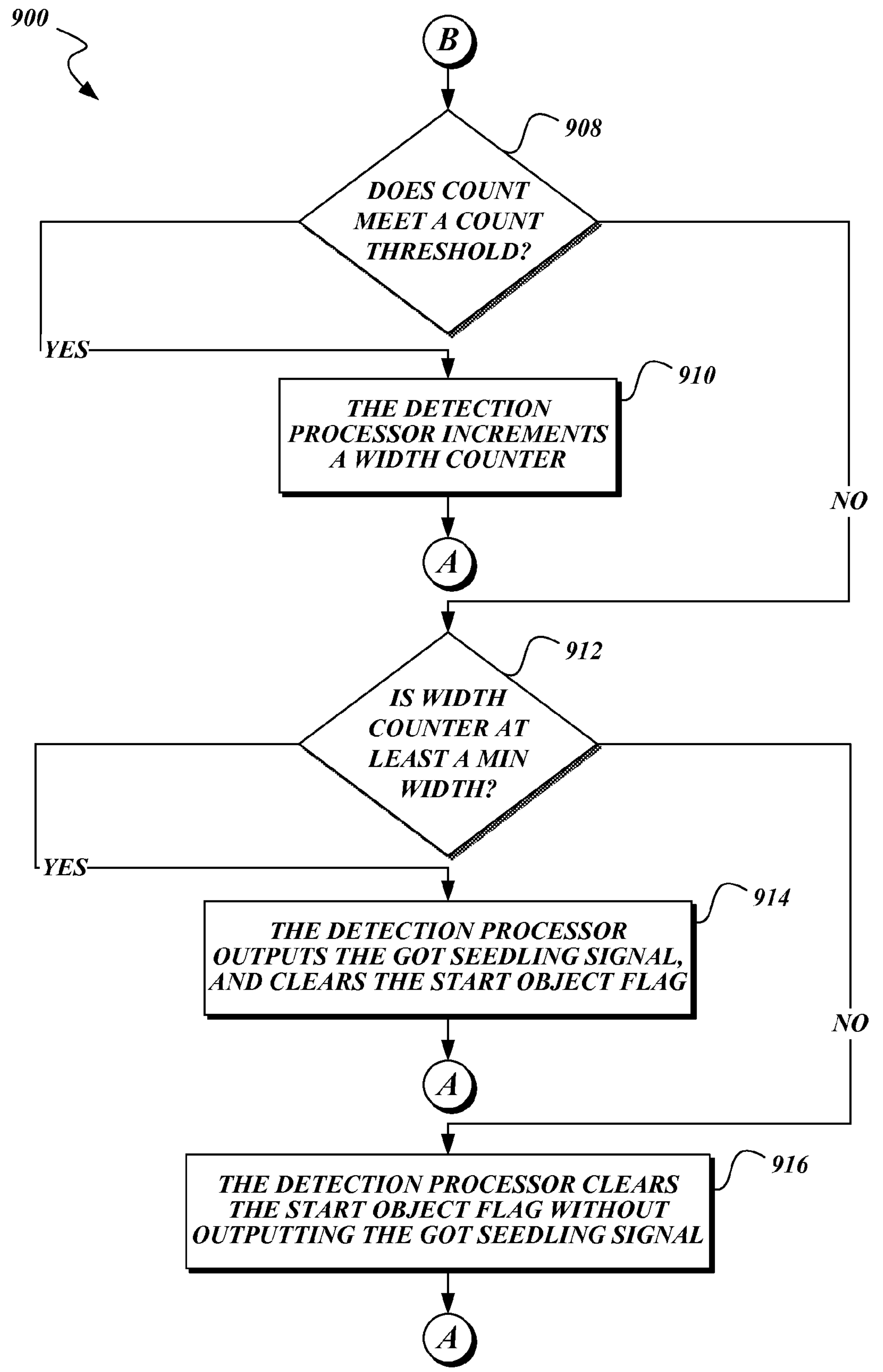
Figure 9C:
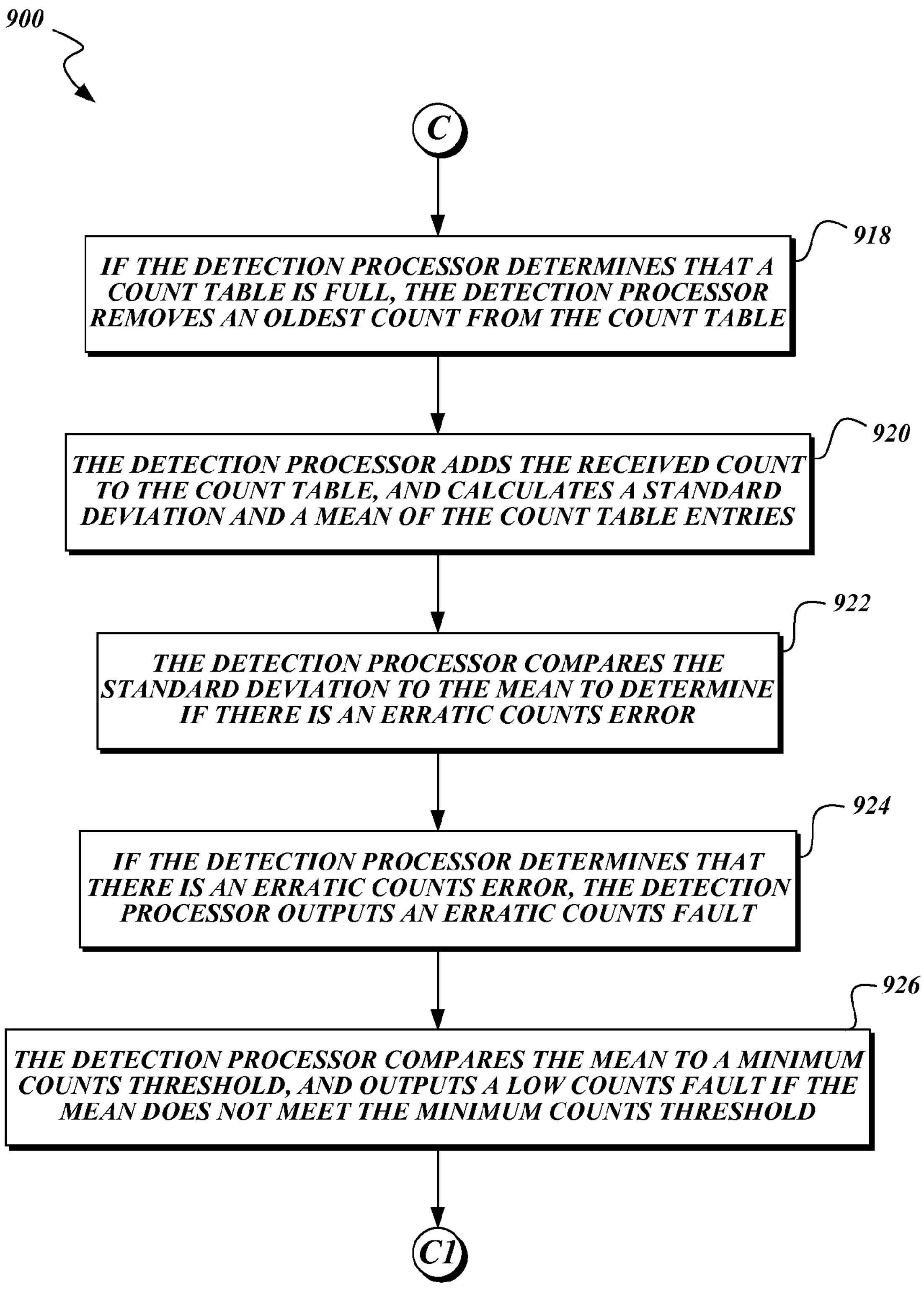
Figure 9D:
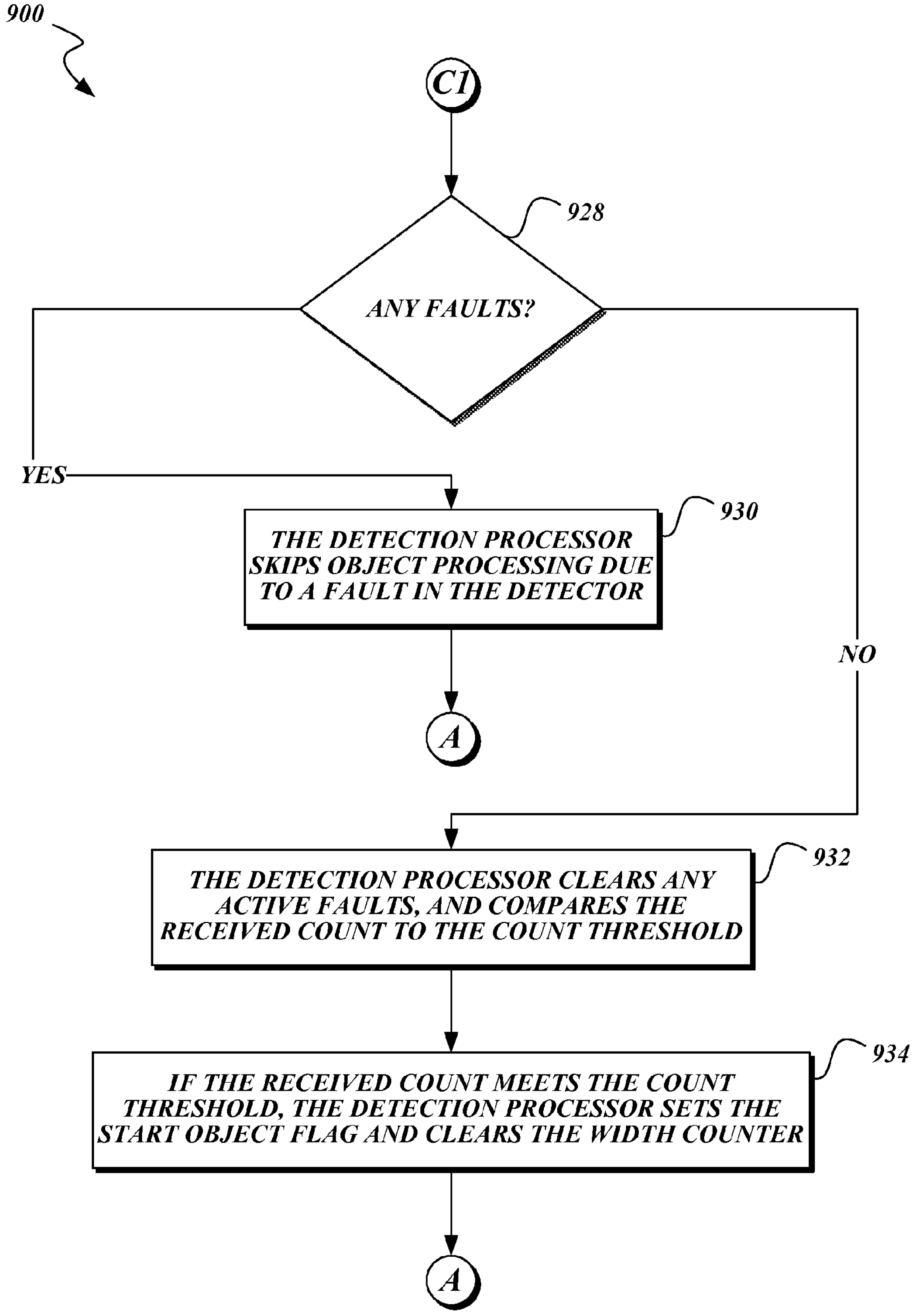

FIG. 8 illustrates an embodiment of a method 800 for counting seedlings. From a start block, the method 800 proceeds to block 802, where a detection processor 158 validates a baseline level of spectral energy detected by a detector 506 and checks for irregularities in the detected energy. Next, at block 804, an object passes between the emitter 102 and the detector 150, thereby attenuating the energy reaching the detector 150. The method 800 then proceeds to block 806, where the detection processor 158 measures an amount and/or duration of attenuation with respect to the baseline level of detected energy. Next, at block 808, the detection processor 158 analyzes the amount and/or duration of attenuation to determine a size of the object. The method 800 then proceeds to block 810, where, if the detection processor 158 determines that one or more size thresholds have been met, the detection processor 158 indicates that a seedling passed through the seedling counter 100.

FIGS. 9A-9D illustrate a more complex method 900 for counting seedlings passing through a seedling detector 100. This method 900 is similar to the method 800 discussed above, and in some embodiments, portions of the method 900 may be incorporated into the method 800, and vice versa. Overall, the method 900 receives a count generated by a detector 150, performs processing on that count, and then loops back to await the next generated count. Hence, the method 900 will not proceed to an end block; instead, all logical paths loop back to the beginning of the method. In some embodiments, the method 900 may be terminated at any time by interrupting power to a component executing the method 900. In other embodiments not illustrated here but apparent to one of ordinary skill in the art, additional logic may be included to check for conditions that cause the loop to terminate.

From a start block, the method 900 proceeds to a continuation terminal ("terminal A"), and then to block 902, where the detection processor 158 waits for a count to be generated by a detector 150. As discussed above, a count is a measure of energy detected by the detector 150 during a detection interval. A low count indicates that an object passing through the seedling counter 100 is attenuating the energy detected by the detector 150 during the previous detection interval, whereas a high count indicates a relatively clear path between the emitter 102 and the detector 150 during the associated detection interval.

Next, at block 904, the detection processor 158 receives a count from the detector 150, and clears a GOT SEEDLING signal output (which will be further described below). The method 900 then proceeds to a decision block 906, where a test is performed to determine whether a START OBJECT flag is set. The START OBJECT flag indicates that the previous count showed an object passing between the emitter 102 and the detector 150. If the answer to the test at decision block 906 is YES, the method 900 proceeds to a continuation terminal ("terminal B"), where further processing is done relative to determining the nature of the object passing between the emitter 102 and the detector 150.

From terminal B (FIG. 9B), the method 900 proceeds to a decision block 908, where a test is performed to determine whether the count meets a count threshold. The count threshold is used to detect whether the energy detected by the detector is sufficiently attenuated to indicate whether an object above a desired minimum size may be passing between the detector and the emitter. Hence, in one embodiment, the count threshold is a predetermined low value, and the object may be of acceptable size when the count is lower than the count threshold.

If the answer to the test at decision block 908 is YES, the method 900 proceeds to block 910, where the detection processor 158 increments a width counter. The width counter keeps track of the number of consecutive detection intervals during which the count has been lower than the count threshold. The width counter can later be used in conjunction with a speed at which the object moves through the seedling counter 100 to determine the object size (e.g. the diameter of a seedling). The method 900 then proceeds to terminal A to wait for the next count.

If the answer to the test at decision block 908 is NO, the method 900 proceeds to another decision block 912. At this point in the method 900, previous counts had indicated that an object passing through the seedling counter 100 has sufficiently attenuated the energy detected by the detector, but the current count indicates that the object is no longer attenuating the energy. At decision block 912, a test is performed to determine whether the width counter indicates at least a minimum width. The width counter value for an object of a given size varies inversely relative to the speed at which the object passes through the detector. In some embodiments, the minimum width value is automatically established based on a signal supplied by the belt encoder 512 of FIG. 7. In other embodiments, the conveyor may operate at a constant speed and the minimum width can be set to a fixed value that corresponds to the conveyor speed.

If the answer to the test at decision block 912 is YES, then the method 900 has determined that an object of sufficient size to be considered an acceptable seedling has passed through the seedling counter 100. Accordingly, the method 900 proceeds to block 914, where the detection processor 158 outputs the GOT SEEDLING signal, clears the START OBJECT flag, and proceeds to terminal A to wait for the next count. In one embodiment, the GOT SEEDLING signal is received by the programmable logic controller 514 to increment a seedling counter.

If the answer to the test at decision block 912 is NO, then the method 900 has determined that the object passing the detector 150 was of insufficient size to be considered a seedling. This can happen if the object is debris, branches, leaves, or needles, and is therefore of insufficient size. This could also happen if the object is a cull seedling of insufficient size to be included in the seedling count. When insufficient size is detected, the method 900 proceeds to block 916, where the detection processor 158 clears the START OBJECT flag without outputting the GOT SEEDLING signal, and proceeds to terminal A to wait for the next count.

If the answer to the test at decision block 906 (FIG. 9A) is NO, the method 900 proceeds to a continuation terminal ("terminal C"), where further processing is done relating to error detection and initial identification of an object passing through the seedling counter 100. As discussed above, the detection processor 158 stores received counts in a count table. Statistical processing can then be performed on the counts stored in the count table to ensure that the received counts correspond to an expected distribution. For example, in embodiments that use X-rays, the received counts are expected to correspond to a Poisson distribution. If the received counts do not correspond to a Poisson distribution, it is likely that either the energy emitter 106 or the detector 150 is not working properly. As another example, an average or mean of the received counts can be monitored to ensure that at least a minimum amount of energy is reaching the detector 150 when no object is passing through the seedling counter 100.

From terminal C (FIG. 9C), the method 900 proceeds to block 918, where, if the detection processor 158 determines that the count table is full, the detection processor 158 removes an oldest count from the count table. Next, at block 920, the detection processor 158 adds the received count to the count table, and calculates a standard deviation and a mean of the count table entries. The method 900 then proceeds to block 922, where the detection processor 158 compares the standard deviation to the mean to determine if there is an erratic counts error. In a Poisson distribution, the square root of the mean is expected to be normally distributed. Hence, in an embodiment utilizing X-rays, an erratic counts error is found if the standard deviation is greater than twice the square root of the mean. Next, at block 924, if the detection processor 158 determines that there is an erratic counts error, the detection processor 158 outputs an erratic counts fault.

The method 900 then proceeds to block 926, where the detection processor 158 compares the mean to a minimum counts threshold, and outputs a low counts fault if the mean does not meet the minimum counts threshold. In one embodiment, these faults are received by the programmable logic controller to further control the system or to notify the user that the seedling detector 100 is not operating properly. The method 900 then proceeds to a continuation terminal ("terminal C1").

From terminal C1 (FIG. 9D), the method 900 proceeds to a decision block 928. At decision block 928, a test is performed to determine whether any faults were generated. If the answer to the test in decision block 928 is YES, the method 900 proceeds to block 930, where the detection processor 158 skips seedling processing due to a fault in the detector, and continues to terminal A. If the answer to the test in decision block 928 is NO, the method 900 proceeds to block 932, where the detection processor 158 clears any active faults, and compares the received count to the count threshold. Next, at block 934, if the received count meets the count threshold, the detection processor 158 sets the START OBJECT flag, clears the width counter, and proceeds to terminal A to wait for the next count.

While illustrative embodiments have been illustrated and described, it will be appreciated that various changes can be made therein without departing from the spirit and scope of the invention.

The invention claimed is:

1. A method for counting objects, comprising:

directing energy for impingement on a detector;

sensing a reduction in detected energy indicating that an object is passing in front of the detector;

determining that the reduction in the detected energy fell below at least one threshold, wherein the reduction in the detected energy below the at least one threshold is indicative of a thickness of the object;

determining a duration that the detected energy remained below the at least one threshold, wherein the duration that the detected energy remained below the threshold is indicative of a width of the object; and determining whether to increment an object count based upon the determination that the detected energy fell below the at least one threshold and based upon the duration that the detected energy remained below the at least one threshold.

2. The method of claim 1, wherein the energy is X-ray energy, and the detected energy comprises a count of X-ray energy received by the detector over at least one detection interval.

3. The method of claim 1, further comprising validating a measurement of the detected energy.

4. The method of claim 3, wherein validating the measurement of detected energy comprises storing a number of measurements of the detected energy.

5. The method of claim 4, further comprising:
calculating a standard deviation and a mean of the number of measurements of the detected energy;
comparing the standard deviation to the mean; and
indicating a fault if the standard deviation is greater than twice the square root of the mean.

6. The method of claim 4, further comprising:
calculating a mean of the number of measurements of the detected energy;
comparing the mean to a baseline threshold; and
indicating a fault if the mean is less than the baseline threshold.

7. A method for counting seedlings, comprising:
obtaining a first sample of X-ray radiation received from an X-ray source by a detector, the first sample comprising a count of received X-ray radiation;
comparing the count of the first sample to a count threshold; and
when the count is less than the count threshold:
obtaining at least one additional sample of X-ray radiation received from the X- ray source by the detector;
incrementing a width counter for each consecutive additional sample following the first sample for which a count of the additional sample remains less than the threshold, until an additional sample comprising a count that is not less than the threshold is obtained; and
incrementing a seedling count if the width counter is greater than or equal to a width threshold.

8. The method of claim 7, wherein samples are obtained at a fixed sampling rate.

9. The method of claim 8, further comprising:
moving a sequence of seedlings past the detector;
detecting the speed at which seedlings move past the detector; and
adjusting the width threshold based on the detected speed and the fixed sampling rate.

10. The method of claim 7, further comprising, when the count is not less than the count threshold, storing the count in a count table.

11. The method of claim 10, further comprising:
performing statistical analysis on the count table to determine if the counts of the obtained samples fit an expected distribution; and
signaling a fault when the obtained samples are not within the expected distribution.

12. The method of claim 7, wherein the X-ray radiation has an energy on the order of 5 keV to 10 keV.

13. A device for counting objects, comprising:
an X-ray emitter;
an X-ray detector arranged to detect X-ray radiation emitted by the X-ray emitter; and
a detection processor coupled to the X-ray detector and configured to:
monitor a level of the detected X-ray radiation,
determine a reduction in the detected X-ray radiation below at least one threshold and a duration that the detected X-ray radiation remained below the at least one threshold, wherein the reduction in the detected X-ray radiation below the at least one threshold is indicative of a thickness of the object, and wherein the duration that the detected X-ray radiation remained below the threshold is indicative of a width of the object, and
determine whether to increment an object count based on the determined reduction and the determined duration.

14. The device of claim 13, wherein the X-ray emitter is configured to emit X-ray radiation having an energy on the order of 5 keV to 15 keV.

15. The device of claim 13, further comprising:
an apparatus for causing objects to pass by the detector; and
an encoder coupled to the detection processor for determining the speed at which objects move past the device.

16. The device of claim 13, wherein the X-ray detector comprises:
a scintillating crystal; and
a photomultiplier tube coupled to the scintillating crystal.

17. The device of claim 16, wherein the X-ray detector further comprises at least one strip of metal arranged between the scintillating crystal and the X-ray emitter for collimating emitted X-rays.

18. The device of claim 16, wherein the X-ray detector further comprises a detector housing including a low density plastic positioned between the scintillating crystal and the X ray emitter.

* * * * *